(12) United States Patent
Blasco Serrano et al.

(10) Patent No.: US 11,064,451 B2
(45) Date of Patent: Jul. 13, 2021

(54) SELECTION OF TIME REFERENCE TYPE FOR DEVICE-TO-DEVICE RADIO COMMUNICATION

(71) Applicant: Telefonaktiebolaget LM Ericsson (publ), Stockholm (SE)

(72) Inventors: Ricardo Blasco Serrano, Espoo (FI); Stefano Sorrentino, Solna (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 0 days.

(21) Appl. No.: 16/073,976

(22) PCT Filed: Feb. 3, 2017

(86) PCT No.: PCT/EP2017/052447
§ 371 (c)(1),
(2) Date: Jul. 30, 2018

(87) PCT Pub. No.: WO2017/134261
PCT Pub. Date: Aug. 10, 2017

(65) Prior Publication Data
US 2019/0045468 A1 Feb. 7, 2019

Related U.S. Application Data

(60) Provisional application No. 62/291,561, filed on Feb. 5, 2016.

(51) Int. Cl.
*H04W 56/00* (2009.01)
*H04W 76/14* (2018.01)
(Continued)

(52) U.S. Cl.
CPC ..... *H04W 56/0015* (2013.01); *H04W 56/002* (2013.01); *H04W 56/0025* (2013.01);
(Continued)

(58) Field of Classification Search
CPC ............... H04W 56/002; H04W 84/00; H04W 56/0025; H04W 56/0015; H04W 76/14; H04W 88/04; H04L 27/2657
See application file for complete search history.

(56) References Cited

U.S. PATENT DOCUMENTS

2016/0337839 A1* 11/2016 Chae ................. H04W 72/1242
2016/0337995 A1 11/2016 Chae
(Continued)

FOREIGN PATENT DOCUMENTS

EP 3091798 A1 11/2016
WO 2015010542 A1 1/2015
(Continued)

OTHER PUBLICATIONS

3rd Generation Partneship Project, "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 13)", Technical Specification, 3GPP TS 36.300 V13.2.0, Dec. 1, 2015, pp. 1-290, 3GPP, France.
(Continued)

*Primary Examiner* — Mandish K Randhawa
(74) *Attorney, Agent, or Firm* — Christopher & Weisberg, P.A.

(57) ABSTRACT

A radio terminal (110) determines selection information, e.g., by receiving the selection information from another radio terminal (110') or a base station (100) of a cellular radio network. Depending on the selection information, the radio terminal (110) selects a time reference type from a plurality of time reference types. Based on the selected time reference type, the radio terminal (110) receives signals (204, 208) from a further radio terminal (110').

9 Claims, 12 Drawing Sheets

(51) Int. Cl.
*H04W 84/00* (2009.01)
*H04L 27/26* (2006.01)
*H04W 88/04* (2009.01)

(52) U.S. Cl.
CPC ........... *H04W 76/14* (2018.02); *H04W 84/00* (2013.01); *H04L 27/2657* (2013.01); *H04W 88/04* (2013.01)

(56) References Cited

U.S. PATENT DOCUMENTS

| | | | |
|---|---|---|---|
| 2016/0374038 A1 | 12/2016 | Wang | |
| 2017/0086158 A1* | 3/2017 | Feng | H04W 56/0015 |
| 2018/0234935 A1* | 8/2018 | Uchiyama | H04W 56/00 |
| 2018/0242317 A1* | 8/2018 | Marinier | H04W 72/042 |

FOREIGN PATENT DOCUMENTS

| | | |
|---|---|---|
| WO | 2015020603 A1 | 2/2015 |
| WO | 2015065262 A1 | 5/2015 |
| WO | 2015109528 A1 | 7/2015 |
| WO | 2015115795 A1 | 8/2015 |
| WO | 2015115974 A1 | 8/2015 |
| WO | 2015168931 A1 | 11/2015 |

OTHER PUBLICATIONS

3rd Generation Partnership Project, "3rd Generation Partnership Project; Technical Specification Group Radio Access Network; Study on LTE-based V2X Services; (Release 14)", Technical Report, 3GPP TR 36.885 V0.4.0, Nov. 1, 2015, pp. 1-59, 3GPP, France.

Ericsson, "Distributed Synchronization Procedure for V2X over PC5", Discussion and Decision, 3GPP TSG RAN WG1 Meeting #83, Anaheim, USA, Nov. 15, 2015, pp. 1-6, R1-157369.

Ericsson, "General Discussion on V2X-PC5 Synchronization", 3GPP TSG RAN WG1 Meeting #83, Anaheim, USA, Nov. 16, 2015, pp. 1-6, R1-157367.

LG Electronics, "New WI proposal: Support for V2V services based on LTE sidelink", 3GPP TSG RAN Meeting #70, Sitges, Spain, Dec. 7, 2015, pp. 1-8, RP-152293.

LG Electronics, "New WI proposal: Support for V2V services based on LTE sidelink", 3GPP TSG RAN Meeting #70, Sitges, Spain, Dec. 7, 2015, pp. 1-8, RP-152269.

* cited by examiner

SELECTION OF TIME REFERENCE TYPE FOR DEVICE-TO-DEVICE RADIO COMMUNICATION

TECHNICAL FIELD

The present invention relates to methods for controlling radio transmission and to corresponding devices.

BACKGROUND

In the LTE (Long Term Evolution) radio technology specified by 3GPP ($3^{rd}$ Generation Partnership Project) direct radio communication of radio terminals is also supported. This type of radio communication is also referred to as device-to-device (D2D) communication or "sidelink" communication. The D2D communication may for example be utilized for commercial applications or and public safety applications. By way of example, 3GPP TS 36.300 V13.2.0 (2015-12) defines sidelink communication features which include device discovery, to enable a user equipment (UE) to sense the proximity of another UE, or direct transfer of data on physical channels terminated directly between UEs.

In 3GPP TR 36.885 V0.4.0 (2015-11), V2X communication is discussed as one potential application of the LTE sidelink communication. V2X communication includes any direct communication between vehicles, pedestrians and infrastructure, specifically V2V (vehicle-to-vehicle), V2P (vehicle-to-pedestrian), and V2I (vehicle-to-infrastructure) communication.

The LTE radio technology is based on OFDM (Orthogonal Frequency Division Multiplexing). Typically, efficient de-multiplexing of signals at a receiver requires that a sampling window is aligned with a precision corresponding the duration of a cyclic prefix (CP), which typically is a few microseconds, with respect to the signals. This precision can be achieved by adjusting the sampling window with respect to the utilized time reference. This adjustment may for example involve first receiving certain reference or synchronization signals that allow fine timing estimation and subsequently adjusting the sampling window based on the estimated fine timing. The time reference is in many cases provided by a synchronization signal transmitted by a base station, referred to as eNB (evolved Node B).

In the case of V2X communication or other kinds of D2D communication, also deployments using another type of time reference are considered, including a time reference derived from sidelink signals transmitted by another UE or a time reference derived from a GNSS (Global Navigation Satellite System). These time reference types may in some cases also define an offset, e.g., in terms of a timing advance (TA) as configured by an eNB to align the signals received at the eNB or a TA compensating the propagation delay from eNB to the UE. However, it is a demanding task to define a time reference type which provides satisfactory performance in the various kinds of possible application scenarios, specifically in the case of V2X communication where UEs may move at considerable velocity with respect to each other and also with respect to the eNBs.

Accordingly, there is a need for techniques which allow for efficiently controlling reception timing in D2D communication scenarios.

SUMMARY

According to an embodiment of the invention, a method of controlling radio transmission is provided. According to the method, a radio terminal determines selection information. Depending on the selection information, the radio terminal selects a time reference type from a plurality of time reference types. Based on the selected time reference type, the radio terminal receives signals from a further radio terminal.

According to a further embodiment of the invention, a method of controlling radio transmission is provided. According to the method, selection information is sent to a radio terminal. The selection information indicates which time reference type from a plurality of time reference types is to be selected by the radio terminal for reception of signals from a further radio terminal.

According to a further embodiment of the invention, a radio terminal is provided. The radio terminal is configured to determine selection information. Further, the radio terminal is configured to, depending on the selection information, select a time reference type from a plurality of time reference types. Further, the radio terminal is configured to, based on the selected time reference type, receive signals from a further radio terminal.

According to a further embodiment of the invention, a radio device is provided. The radio device is configured to send selection information to a radio terminal. The selection information indicates which time reference type from a plurality of time reference types is to be selected by the radio terminal for reception of signals from a further radio terminal. The radio device can be a radio terminal, e.g., the further radio terminal from which the signals are received. Alternatively, the radio device can be a base station of a cellular radio network.

According to a further embodiment of the invention, a computer program or computer program product is provided, e.g., in the form of a non-transitory storage medium, which comprises program code to be executed by at least one processor of a radio terminal. Execution of the program code causes the radio terminal to determine selection information. Further, execution of the program code causes the radio terminal to, depending on the selection information, select a time reference type from a plurality of time reference types. Further, execution of the program code causes the radio terminal to, based on the selected time reference type, receive signals from a further radio terminal.

According to a further embodiment of the invention, a computer program or computer program product is provided, e.g., in the form of a non-transitory storage medium, which comprises program code to be executed by at least one processor of a radio device. Execution of the program code causes the radio device to send selection information to a radio terminal. The selection information indicates which time reference type from a plurality of time reference types is to be selected by the radio terminal for reception of signals from a further radio terminal. The radio device can be a radio terminal, e.g., the further radio terminal from which the signals are received. Alternatively, the radio device can be a base station of a cellular radio network.

Details of such embodiments and further embodiments will be apparent from the following detailed description of embodiments.

DETAILED DESCRIPTION OF EMBODIMENTS

In the following, concepts in accordance with exemplary embodiments of the invention will be explained in more detail and with reference to the accompanying drawings. The illustrated embodiments relate to reception timing control in D2D communication of radio terminals, in the following also referred to as UEs. The D2D communication may for example be implemented by sidelink functionalities of the LTE radio technology, e.g., as specified in 3GPP TS 36.300 V13.2.0 (2016-01). However, it is to be understood that the illustrated concepts could also be applied to other radio technologies supporting D2D communication, e.g., a 5G (5$^{th}$ Generation) cellular radio technology. The D2D communication may specifically correspond to V2X communication and may be used to support various kinds of ITS (Intelligent Transport System) applications. However, it is noted that the illustrated concepts could also be applied to other types of D2D communication.

Figure 1:
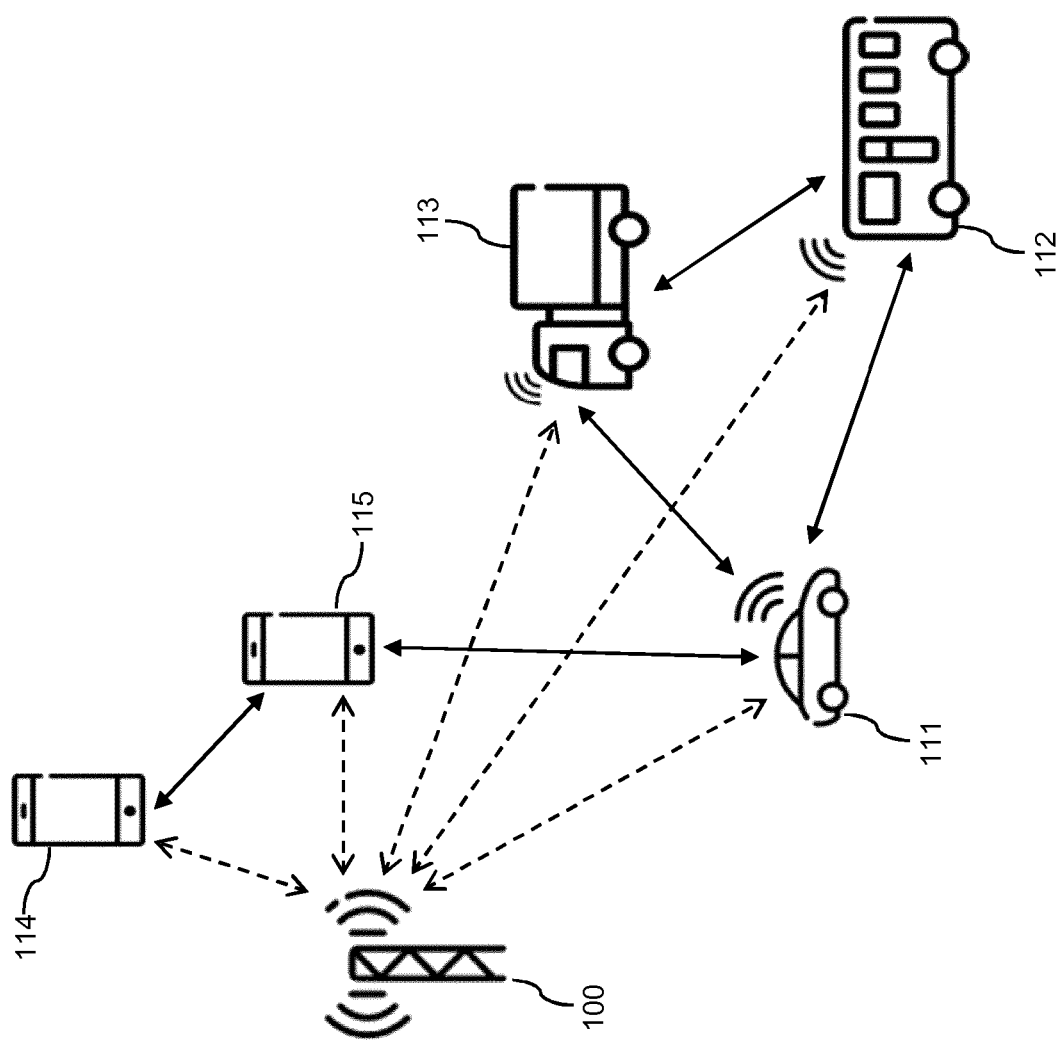
FIG. 1 schematically illustrates various D2D communication scenarios in which reception timing may be controlled in according to an embodiment of the invention.

FIG. 1 schematically illustrates various scenarios of D2D communication in which the illustrated concepts may be applied. Specifically, FIG. 1 illustrates a base station 100 of a cellular radio network, e.g., an eNB of the LTE radio technology, and UEs 111, 112, 113, 114, 115. The UEs 111, 112, 113, 114, 115 are assumed to support D2D communication, as illustrated by solid arrows. Further, the UEs 111, 112, 113, 114, 115 are assumed to also support regular downlink and uplink communication with the base station 100, as illustrated by dashed arrows. As illustrated, various kinds of UEs may act as transmitter or receiver of D2D communication. For example, the UEs may correspond to vehicle based radio terminals 111, 112, 113 or to radio terminals 114, 115 carried by pedestrians, such as mobile phones or similar mobile communication devices. It is noted that also other kinds of UEs could act as receiver or transmitter of D2D communication, such as a UE is associated with stationary traffic infrastructure, e.g., with traffic signs or the like. Accordingly, the D2D communication may include various types of V2X communication, in particular V2V communication, V2P communication, and V2I communication.

In the scenario of FIG. 1, D2D communication signals may for example be utilized for transmitting various kinds of V2X communication messages. Examples of such messages are a Co-operative Awareness Message (CAM) and a Decentralized Environmental Notification Message (DENM) as defined by ETSI (European Telecommunications Standards Institute) for road safety purposes. The CAM message is intended to enable vehicles, including emergency vehicles, to notify their presence and other relevant parameters in a broadcast fashion. Such messages target other vehicles, pedestrians, and infrastructure, and are handled by their applications. The CAM message may also serve as active assistance to safety driving for normal traffic. The availability of a CAM message is checked for every 100 milliseconds (ms), yielding a maximum detection latency requirement of less than 100 ms for most messages. The latency requirement for pre-crash sensing warning is 50 ms. The DENM message is event-triggered, such as by braking, and the availability of a DENM message is also checked for every 100 ms. For the DENM message, a maximum latency of less than 100 ms is specified. A package size of the CAM and DENM message may vary from 100 to 800 bytes and a typical size is around 300 bytes. The messages are supposed to be detected by all vehicles in a certain proximity range, e.g., of 300 meter (m). A further example of a V2X communication message which may be transmitted by the D2D communication signals is a Basic Safety Message (BSM) for DSRC (Dedicate Short Range Communication) as defined by SAE (Society of the Automotive Engineers).

In the illustrated concepts, it is assumed that the utilized radio technology operates in a synchronous manner, which means that it is typically necessary that that transmitter and receiver share a common time reference, up to a certain precision. This assumption for example applies to the LTE radio technology and similar OFDM based radio technologies. Here, it is often required that transmitter and receiver use time references whose difference does not exceed the duration of an OFDM cyclic prefix. In this way, the receiver is enabled to correctly place its reception sampling window, and inter-carrier interference can be reduced. Various mechanisms may be applied for ensuring that the utilized time reference has sufficient precision. For example, in the LTE radio technology or similar cellular radio technology such mechanism may be based on the fact in most cases one end of a radio link is formed by a base station, such as an eNB of the LTE radio technology. Accordingly, in downlink transmission from the base station to one or more UEs, a time reference defined by a downlink signal from the base station may be used. In this case, each UE may derive its time reference based on the downlink signal transmitted by the base station. A satisfactory time alignment of reception sampling windows can be achieved for multiple UEs because all UEs can synchronize to a single one transmitter, i.e., the base station. In uplink transmission from one or more UEs to the base station, a time reference for each UE may be derived from downlink signals from the base station and a UE-specific timing offset, referred to as timing advance (TA). Also in this case, a satisfactory alignment of transmissions with respect to a reception time window applied by the base station can be achieved because all the UEs need to align with the same receiver, the base station. However, the situation is already more complex than in the case of downlink transmission because each UE may be located differently relative to the base station, resulting in different propagation delays from the UE to the base station and accordingly individualized setting of the TA for each UE. It should also be noted that the above considerations apply individually with respect to each base station, and if a UE changes from one base station to another, the derivation of time references needs to be adapted to the new base station.

In the case of D2D communication, specifically V2X communication, more complex situations need to be considered. In particular, there might be several transmitters using FDMA (Frequency Division Multiple Access) or CDMA (Code Division Multiple Access) to simultaneously communicate with many receivers. This may require that each pair of possible transmitter and receiver, e.g., UEs within an intended communication range, establish time references which are mutually aligned with the required precision. Establishing such time references is complicated by the fact that the underlying link topologies are less predictable than in the case of communication with a stationary base station and may change quickly over time.

By way of example, in the case of V2X communication, using a downlink signal from a base station to derive the timing reference as described above may yield unsatisfactory results. For example, the targeted coverage area of V2X communication around a transmitting V2X UE, e.g., in a range of some hundreds of meters, may extend across the boundary of cells served by different base stations. Accordingly, it may happen that the respective time reference of the transmitting V2X UE and the receiving V2X UE are derived from downlink signals transmitted by different base stations, so that the required alignment precision cannot be obtained, especially if the two base stations are not synchronized with respect to each other. Moreover, even if the two base stations are synchronized, differences in cell geometry and/or in the locations of the transmitting V2X UE and the receiving V2X UE in relation to the respective base station may preclude achieving the desired alignment precision. For example, the transmitting V2X UE may be located very close to its serving base station, whereas the receiving V2X UE may be located far away from its serving base station. Accordingly, significantly different TA values could be configured for the transmitting V2X UE and the receiving V2X UE, rendering the respective time references incompatible for direct V2X communication. Still further, if a V2X UE is out of coverage, i.e., cannot receive signals from any base station, it would also be unable to derive a time reference for V2X communication. Similar considerations may apply with respect to other types of D2D communication.

The illustrated concepts aim at facilitating establishment of time references with sufficient alignment precision by supporting selection between different time reference types. Accordingly, rather than requiring that each D2D UE uses the same time reference type, e.g., a time reference type based on downlink signals from a base station as explained above, each D2D UE may select a time reference type which is appropriate for the considered D2D communication scenario. For example, rather than selecting a time reference type defined by a downlink signal from a base station, the D2D UE could select a time reference type defined by a signal from another D2D UE. This other D2D UE may for example correspond to a source of D2D communication signals to be received by the D2D UE. The time reference types may thus be distinguished with respect to the signal from which the time reference is derived. Some time reference types may also be based on absolute time references, such as UTC (Coordinated Universal Time) and may thus avoid deriving the time reference from a specific signal.

Further, some time reference types may be based on a signal which is a superimposition of signals from multiple different sources.

However, the time reference types may also be distinguished in other ways, e.g., with respect to whether or not they define an offset with respect to the signal from which the time reference is derived and/or with respect to the type of this offset. For example, some time reference types may be defined not to use an offset, while others are defined to use an offset. Further, in some cases the offset may correspond to a TA configured for full compensation of propagation delays, whereas in other cases the offset may correspond to a partial TA configured for compensation of half of the propagation delays or to some other type of offset which does not depend on propagation delays. The time reference types may also be distinguished with respect to the type of signal from which the time reference is derived, e.g., may distinguish between time reference types in which the time reference is derived from a dedicated synchronization signal and time reference types in which the time reference is derived from another type of signal, such as from a signal conveying control data or a signal conveying user data.

To support the selection between the different time reference types, the D2D UE determines selection information. The D2D UE may receive the selection information from another radio device, e.g., from a base station or from another D2D UE. The selection information may be broadcasted or may be targeted to one or more individual D2D UEs, e.g., by using unicast transmissions or multicast group transmissions for conveying the selection information. Here, it is noted that the selection information may be conveyed as explicit control information digitally modulated onto signals received by the D2D UE. For example, the D2D UE may receive the selection information on a control channel, such as a PDCCH (Physical Downlink Control Channel) of the LTE radio technology. However, at least a part of the selection information could also be implicitly indicated. For example, the D2D UE could receive a signal, such as a signal conveying a PDCCH or similar control channel, on a certain set of radio resources or resource pool, and this set of radio resources or resource pool could indicate the selection information. Further, at least a part of the selection information could be preconfigured in the D2D UE and for example be applied in connection with measurements of mobility and/or radio conditions. In addition to enabling selection of a certain time reference type, the selection information in some cases may also indicate further information with respect to the specific time reference to be selected by the D2D UE. For example, if the indicated time reference type uses an offset, the selection information could also indicate the value of the offset. Further, the selection information could also identify a source of a signal from which the time reference is derived, or multiple sources of signals of which the superimposition forms the time reference, or a specific absolute time reference such as the UTC.

The selection information may be UE-specific. However, in some scenarios at least a part of the selection information may also apply to groups of D2D UEs, e.g., groups defined in terms of utilized radio resources, in terms of utilized cell, or in terms of utilized control channel or data channel. For example, a base station may indicate by the selection information that D2D UEs camping on its cell should apply a certain time reference type, e.g., a time reference derived from downlink signals transmitted by the base station. The base station could also indicate by the selection information that all D2D UEs camping on other cells, e.g., on neighboring cells, or D2D UEs not camping on any cell (for example due to being out of coverage) should apply an absolute time reference, e.g., based on UTC.

Having established a time reference of the time reference type indicated by the selection information, the D2D UE then receives D2D communication signals based on the established time reference. This may specifically involve setting a reception sampling window depending on the time reference. Such reception sampling window is typically provided for sampling the received signals prior to DFT (Discrete Fourier Transform) processing. The D2D UE utilizing the selection information will in the following therefore also be referred to as "receiving D2D UE", while another D2D UE which transmits the D2D communication signals will be referred to as "transmitting D2D UE".

If the selection information is directly provided by the transmitting D2D UE, the selection information may be conveyed on a control channel, e.g., be included in a scheduling assignment for a transmission of data from the transmitting D2D UE to the receiving D2D UE. Further, the selection information may be piggy-backed or otherwise included in a transmission of data and/or control information from the transmitting D2D UE to the receiving D2D UE.

The above examples of the selection information may be combined in any ways. Depending on the indicated time reference type, different formats or content of the selection information may be used. For example, a TA value may only be included if the indicated time reference type uses a TA. Further, an absolute time reference (such as UTC) may only be identified in the selection information if the indicated time reference type is based on an absolute time reference. In this way, signalling overhead associated with the selection information may be reduced or avoided.

The receiving D2D UE may also use other information in addition to the selection information as a basis for adjusting its reception sampling window. For example, the receiving D2D UE configures the reception sampling window to prioritize detection of those transmitting D2D UEs that are within a certain target range (e.g., within 300 m from the receiving D2D UE). In addition or as an alternative, the receiving D2D UE may also base the setting of the reception sampling window on mobility information, e.g., information about its position, speed, or the like. For example, when moving at high speed the receiving D2D UE may set a reception sampling window to prioritize those transmitting D2D UEs within a larger target range than when moving at lower speed.

Figure 2:
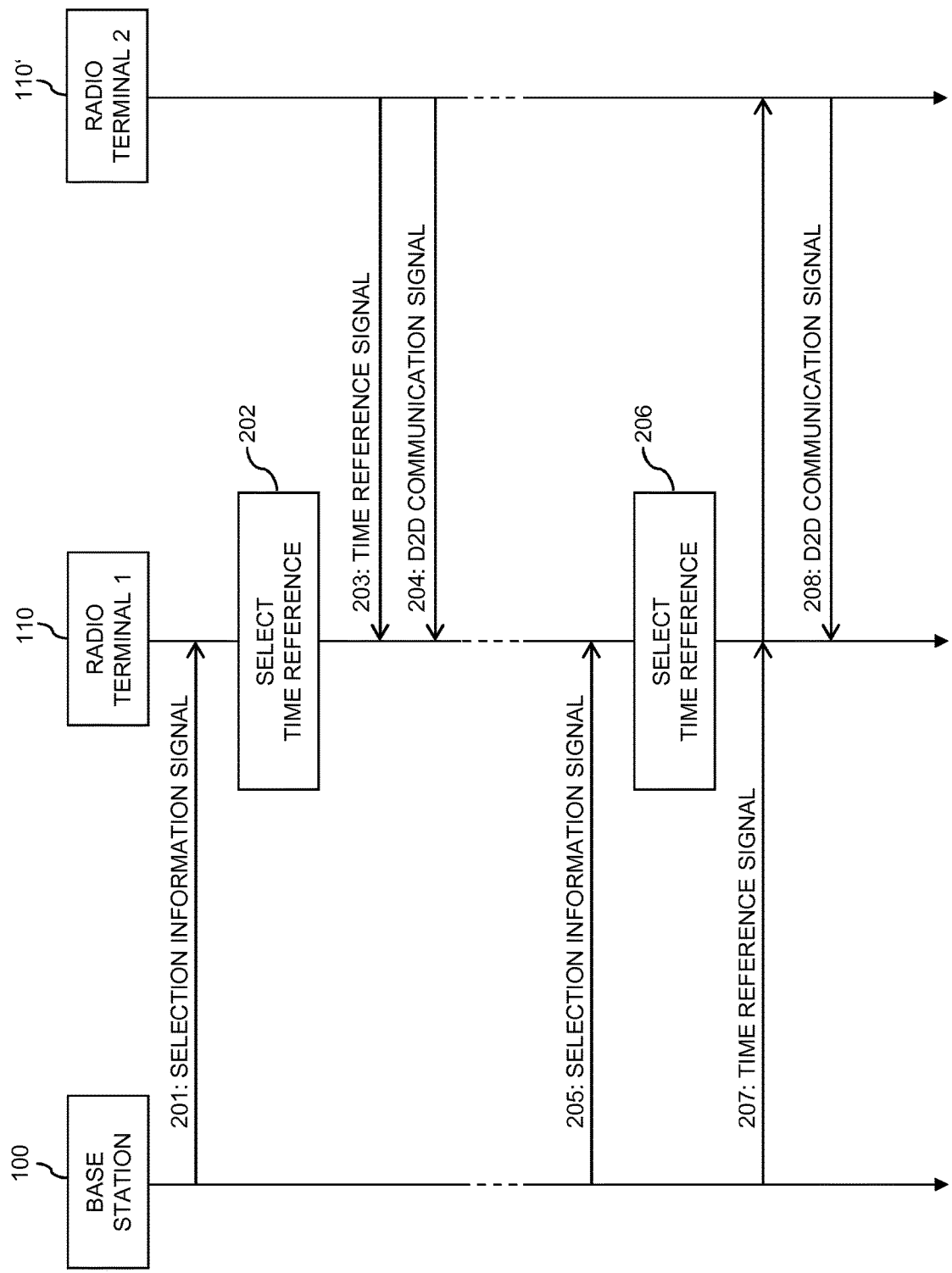
FIG. 2 shows an example of processes according to an embodiment of the invention.

FIG. 2 shows an example of processes which are based on the concepts as outlined above. The processes of FIG. 2 involve the base station 100, a first radio terminal 110, and a second radio terminal 110'. The first radio terminal 110 and the second radio terminal 110' may each correspond to one of the D2D UEs 111, 112, 113, 114, 115. The first radio terminal 110 is assumed to be a receiving D2D UE while the second radio terminal 110' is assumed to be a transmitting D2D UE.

In the processes of FIG. 2, the base station 100 sends a signal 201 indicating selection information to the first radio terminal 110. As mentioned above, the selection information may be modulated as digital information onto the signal 201. However, at least a part of the selection information could also be implicitly indicated by other characteristics of the signal 201. For example, the signal 201 could be transmitted on a certain set of radio resources, e.g., on a certain frequency or using a certain resource pool, and this set of radio resources could be associated with corresponding selection information stored in the first radio terminal 110. Other ways of implicitly indicating the selection information could be utilized as well. The selection information is assumed to indicate at least a time reference type to be applied by the first radio terminal 110 for reception of D2D communication signals from the second radio terminal 110'. Specifically, the selection information indicates a time reference type from a plurality of possible time reference types. These possible time reference types may for example include a time reference type defined by a signal transmitted by a base station, e.g., a signal transmitted by the base station 100, and a time reference type defined by a signal transmitted by another radio terminal, e.g., by the second radio terminal 110'. However, it is to be understood that the number of time reference types is not limited and that there could be further possible time reference types, e.g., a time reference type defined by an absolute time reference. Further, the time reference types could distinguish between time reference types using an offset with respect to a signal from which the time reference is derived, e.g., a TA, and time reference types not using such offset. It is noted that the selection information may apply individually to the first radio terminal 110 or individually to D2D communication of the first radio terminal 110 and the second radio terminal 110'. However, the selection information could also apply to D2D communication of the first radio terminal 110 with a plurality of other radio terminals, including the second radio terminal 110', or to D2D communication of a plurality of radio terminals, including the first radio terminal 110 and the second radio terminal 110'.

As further illustrated by step 202, the first radio terminal 110 selects a time reference based on the selection information. Specifically, the first radio terminal 110 selects a time reference of the type indicated by the selection information. The selection of step 202 may also be based on further information conveyed together with the selection information, e.g., information identifying a source of the signal from which the time reference is to be derived. In the example of FIG. 2, it is assumed that the selection information indicates a time reference type defined by a signal from another radio terminal, further identifies the second radio terminal 110' as the source of this signal, and also indicates that this signal is a dedicated time reference signal, e.g., a synchronization signal. The selection information may for example include a signal identifier, such as a synchronization signal identity or a cell identity, to identify the radio terminal 110' as the source of the signal from which the time reference is to be derived. Accordingly, the time reference selected by the first radio terminal 110 is defined by the time reference signal from the second radio terminal 110 as indicated by the selection information. It is noted that rather than indicating a dedicated time reference signal, the selection information could also indicate that the time reference should be derived from some other type of signal, e.g., a signal conveying control information or user data.

As further illustrated, the first radio terminal 110 then receives the time reference signal 203 from the second radio terminal 110'. Based on the time reference signal 203, the first radio terminal 110 adjusts its reception sampling window. Using the adjusted reception sampling window, the first radio terminal 110 then receives a D2D communication signal 204 from the second radio terminal 110'.

At some later time, the base station 100 transmits a signal 205 indicating updated selection information to the first radio terminal 110. In the illustrated example, it is assumed that the updated selection information indicates a different time reference type, in particular a time reference type defined by a signal from a base station, such as the base station 100. This may for example be due to the base station 100 having detected that the first radio terminal 110 and the second radio terminal 110' are now stationary within a coverage region of the base station 100.

As further illustrated by step 206, the first radio terminal 110 selects a time reference based on the updated selection information. Specifically, the first radio terminal 110 selects a time reference of the type indicated by the updated selection information. The selection of step 206 may also be based on further information conveyed together with the selection information, e.g., information identifying a source of the signal from which the time reference is to be derived. In the example of FIG. 2, it is assumed that the updated selection information indicates a time reference type defined by a signal from a base station, further identifies the base station 100 as the source of this signal, and also indicates that this signal is a dedicated time reference signal, e.g., a synchronization signal. The selection information may for example include a cell identifier (cell ID), a device identifier or a signal identifier to identify the base station 100 as the source of the signal from which the time reference is to be derived. Accordingly, the time reference selected by the first radio terminal 110 at step 206 is defined by the time reference signal from the base station 100 as indicated by the selection information. It is noted that rather than indicating a dedicated time reference signal, the updated selection information could also indicate that the time reference should be derived from some other type of signal, e.g., a signal conveying control information or user data.

As further illustrated, the first radio terminal 110 then receives the time reference signal 207 from the base station 100. Based on the time reference signal 207, the first radio terminal 110 adjusts its reception sampling window. Using the adjusted reception sampling window, the first radio terminal 110 then receives a further D2D communication signal 208 from the second radio terminal 110'. As illustrated, the time reference signal 207 from the base station 100 may also be received by the second radio terminal 110'. The second radio terminal 110' may utilize the time reference signal 207 for adjusting the time of transmitting the further D2D communication signal 208 to the first radio terminal 110.

Figure 3:
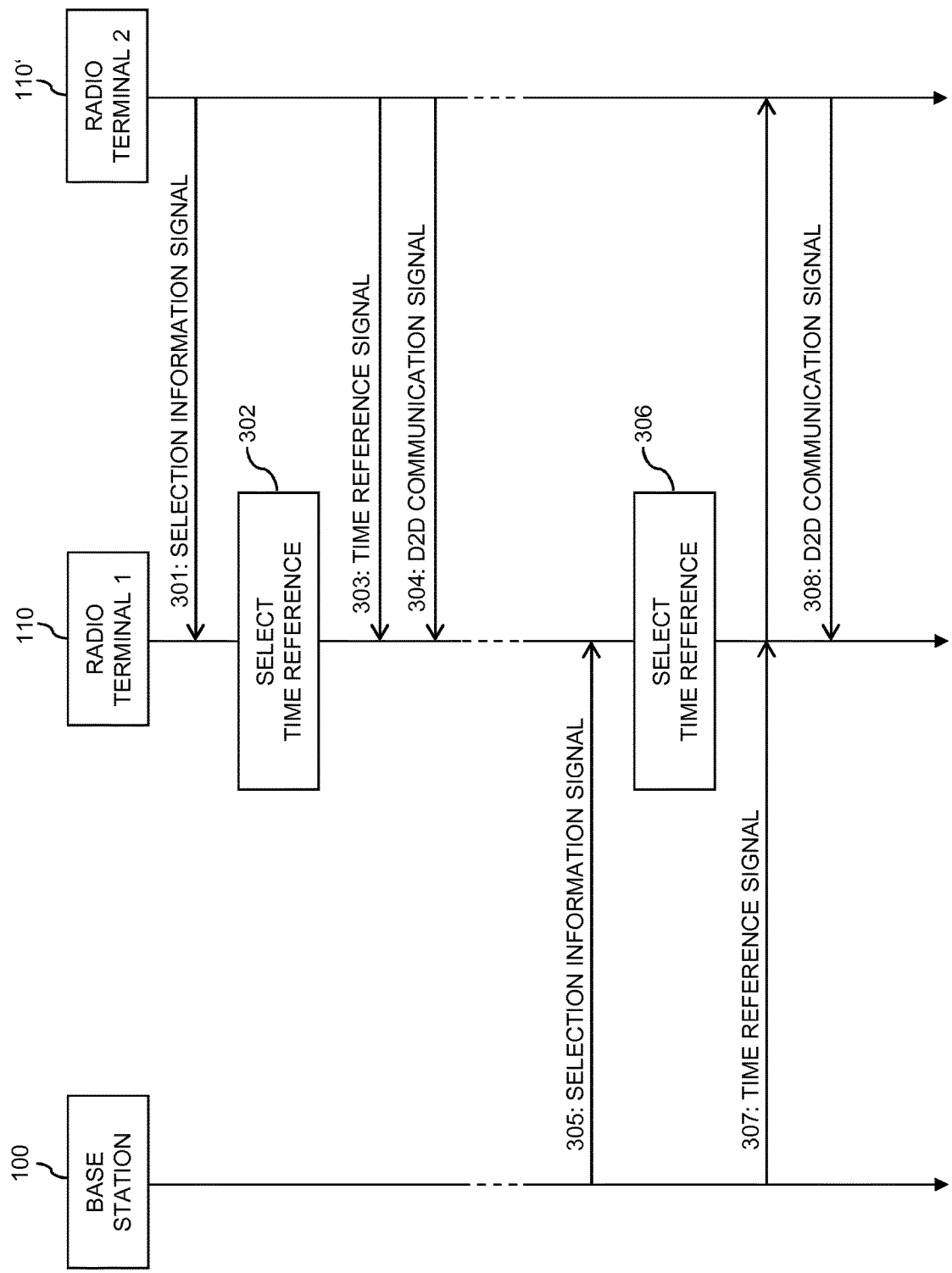
FIG. 3 shows a further example of processes according to an embodiment of the invention.

FIG. 3 shows a further example of processes which are based on the concepts as outlined above. The processes of FIG. 3 involve the base station 100, a first radio terminal 110, and a second radio terminal 110'. The first radio terminal 110 and the second radio terminal 110' may each correspond to one of the D2D UEs 111, 112, 113, 114, 115. The first radio terminal 110 is assumed to be a receiving D2D UE while the second radio terminal 110' is assumed to be a transmitting D2D UE.

In the processes of FIG. 3, the second radio terminal 110' sends a signal 301 indicating selection information to the first radio terminal 110. As mentioned above, the selection information may be modulated as digital information onto the signal 301. However, at least a part of the selection information could also be implicitly indicated by other characteristics of the signal 301. For example, the signal 301 could be transmitted on a certain set of radio resources, e.g., on a certain frequency or using a certain resource pool, and this set of radio resources could be associated with corresponding selection information stored in the first radio terminal 110. Other ways of implicitly indicating the selection information could be utilized as well. The selection information is assumed to indicate at least a time reference type to be applied by the first radio terminal 110 for reception of D2D communication signals from the second radio terminal 110'. Specifically, the selection information indicates a time reference type from a plurality of possible time reference types. These possible time reference types may for example include a time reference type defined by a signal transmitted by a base station, e.g., a signal transmitted by the base station 100, and a time reference type defined by a signal transmitted by another radio terminal, e.g., by the second radio terminal 110'. However, it is to be understood that the number of time reference types is not limited and that there could be further possible time reference types, e.g., a time reference type defined by an absolute time reference. Further, the time reference types could distinguish between time reference types using an offset with respect to a signal from which the time reference is derived, e.g., a TA, and time reference types not using such offset. It is noted that the selection information may apply individually to the first radio terminal 110 or individually to D2D communication of the first radio terminal 110 and the second radio terminal 110'. However, the selection information could also apply to D2D communication of the first radio terminal 110 with a plurality of other radio terminals, including the second radio terminal 110', or to D2D communication of a plurality of radio terminals, including the first radio terminal 110 and the second radio terminal 110'.

As further illustrated by step 302, the first radio terminal 110 selects a time reference based on the selection information. Specifically, the first radio terminal 110 selects a time reference of the type indicated by the selection information. The selection of step 302 may also be based on further information conveyed together with the selection information, e.g., information identifying a source of the signal from which the time reference is to be derived. In the example of FIG. 3, it is assumed that the selection information indicates a time reference type defined by a signal from another radio terminal, further identifies the second radio terminal 110' as the source of this signal, and also indicates that this signal is a dedicated time reference signal, e.g., a synchronization signal. The selection information may for example include a device identifier, such as an RNTI, or a signal identifier to identify the radio terminal 110' as the source of the signal from which the time reference is to be derived. Accordingly, the time reference selected by the first radio terminal 110 is defined by the time reference signal from second radio terminal 110' as indicated by the selection information. It is noted that rather than indicating a dedicated time reference signal, the selection information could also indicate that the time reference should be derived from some other type of signal, e.g., a signal conveying control information or user data.

As further illustrated, the first radio terminal 110 then receives the time reference signal 303 from the second radio terminal 110'. Based on the time reference signal 303, the first radio terminal 110 adjusts its reception sampling window. Using the adjusted reception sampling window, the first radio terminal 110 then receives a D2D communication signal 304 from the second radio terminal 110'.

At some later time, the base station 100 transmits a signal 305 indicating updated selection information to the first radio terminal 110. In the illustrated example, it is assumed that the updated selection information indicates a different time reference type, in particular a time reference type defined by a signal from a base station, such as the base station 100. This may for example be due to the base station 100 having detected that the first radio terminal 110 and the second radio terminal 110' are now stationary within a coverage region of the base station 100.

As further illustrated by step 306, the first radio terminal 110 selects a time reference based on the updated selection information. Specifically, the first radio terminal 110 selects a time reference of the type indicated by the updated selection information. The selection of step 306 may also be based on further information conveyed together with the selection information, e.g., information identifying a source of the signal from which the time reference is to be derived. In the example of FIG. 3, it is assumed that the updated selection information indicates a time reference type defined by a signal from a base station, further identifies the base station 100 as the source of this signal, and also indicates that this signal is a dedicated time reference signal, e.g., a synchronization signal. The selection information may for example include a cell ID, a device identifier, or a signal identifier to identify the base station 100 as the source of the signal from which the time reference is to be derived. Accordingly, the time reference selected by the first radio terminal 110 at step 306 is defined by the time reference signal from the base station 100 as indicated by the selection information. It is noted that rather than indicating a dedicated time reference signal, the updated selection information could also indicate that the time reference should be derived from some other type of signal, e.g., a signal conveying control information or user data.

As further illustrated, the first radio terminal 110 then receives the time reference signal 307 from the base station 100. Based on the time reference signal 307, the first radio terminal 110 adjusts its reception sampling window. Using the adjusted reception sampling window, the first radio terminal 110 then receives a further D2D communication signal 308 from the second radio terminal 110'. As illustrated, the time reference signal 307 from the base station 100 may also be received by the second radio terminal 110'. The second radio terminal 110' may utilize the time reference signal 307 for adjusting the time of transmitting the further D2D communication signal 308 to the first radio terminal 110.

Figure 4:
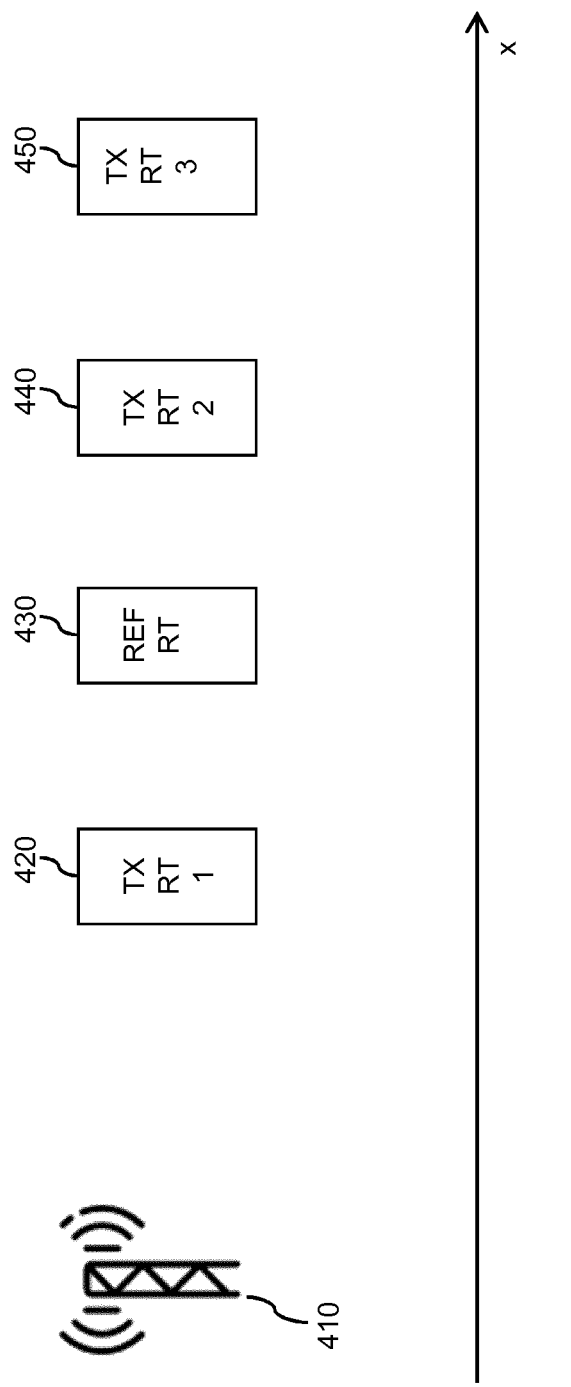
FIG. 4 shows an exemplary scenario for illustrating reception timing variations due to different locations of radio terminals.

FIG. 4 shows an exemplary scenario for illustrating reception timing variations due to different locations of radio terminals. Specifically, FIG. 4 illustrates a deployment of a base station 410, assumed as a source of a time reference signal, and multiple radio terminals (RTs) 420, 430, 440, 450. The radio terminals are assumed to include multiple transmitting (TX) D2D radio terminals 420, 440, 450 and a receiving D2D radio terminal 430, also termed as reference (REF) radio terminal. The transmitting radio terminals 420, 440, 450 are assumed to control the timing of transmitting D2D communication signals based on the time reference defined by the time reference signal from the base station 410. The receiving radio terminal 430 is in turn assumed to control reception of the D2D communication signals, in particular the reception sampling window, based on the time reference defined by the time reference signal from the base station 410.

As illustrated by location axis x, the radio terminals 420, 430, 440, 450 are located at different distances from the base station 410. Accordingly, the time reference signal from the base station 410 experiences different propagation delays before being received by the radio terminals 420, 430, 440, 450. Further, also the D2D communication signals from the transmitting radio terminals 420, 440, 450 may experience different propagation delays before being received by the receiving radio terminal 430.

Figure 5:
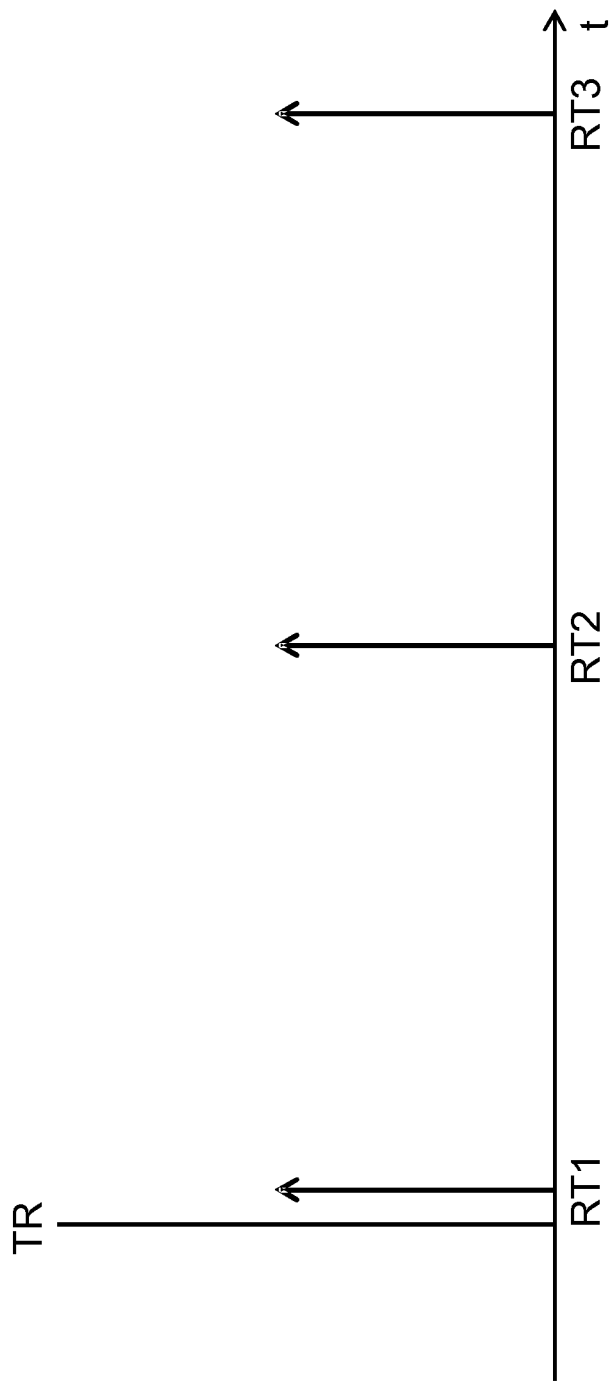
FIG. 5 shows an example of reception timing in the scenario of FIG. 5 when using a time reference without timing advance.
Figure 6:
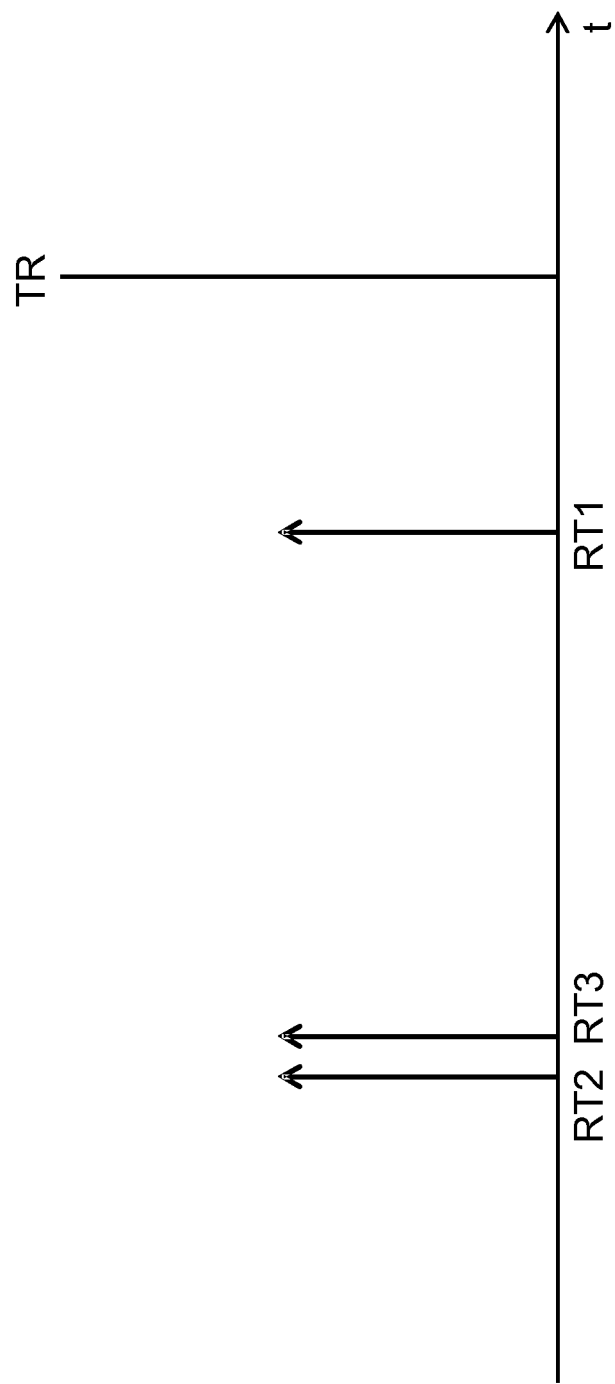
FIG. 6 shows an example of reception timing in the scenario of FIG. 5 when using a time reference with a timing advance configured for full compensation of propagation delays.

FIGS. 5 and 6 illustrate the effect of using different time reference types in the scenario of FIG. 4. In the case of FIG. 5, it is assumed that a time reference type defined by the time reference signal from the base station 410 without any TA or other offset is utilized. As can be seen, the receiving radio terminal 430 first receives the time reference signal (denoted by TR) from the base station 410 and the D2D communication signal from the transmitting radio terminal 420 (denoted by RT1), at substantially the same time t. At a later time t, the receiving radio terminal 430 then receives the D2D communication signal from the transmitting radio terminal 440 (denoted by RT2). At a still later time t, the receiving radio terminal 430 then receives the D2D communication signal from the transmitting radio terminal 450 (denoted by RT3). In the case of FIG. 6, it is assumed that a time reference type defined by the time reference signal from the base station 410 with a TA configured for full compensation of propagation delays is utilized.

This means that with increasing distance from the base station 410, the transmitting radio terminals 420, 440, 450 are configured with a larger TA value. As can be seen, in this case the receiving radio terminal 430 first receives the D2D communication signals from the transmitting radio terminal 440 (denoted by RT2) and the D2D communication signal from the transmitting radio terminal 450 (denoted by RT3), at substantially the same time t. At a later time t, the receiving radio terminal 430 then receives the D2D communication signal from the transmitting radio terminal 420 (denoted by RT1). At a still later time t, the receiving radio terminal 430 then receives the time reference signal (denoted by TR) from the base station 410.

As can be seen from the examples of FIGS. 5 and 6, the receiving radio terminal may need to adjust its reception sampling window differently depending on the utilized time reference type, i.e., depending on whether a time reference type with TA or a time reference type without TA is utilized. Specifically, if no TA is used, the reception sampling window should be delayed as compared to the case if a TA used.

Figure 7:
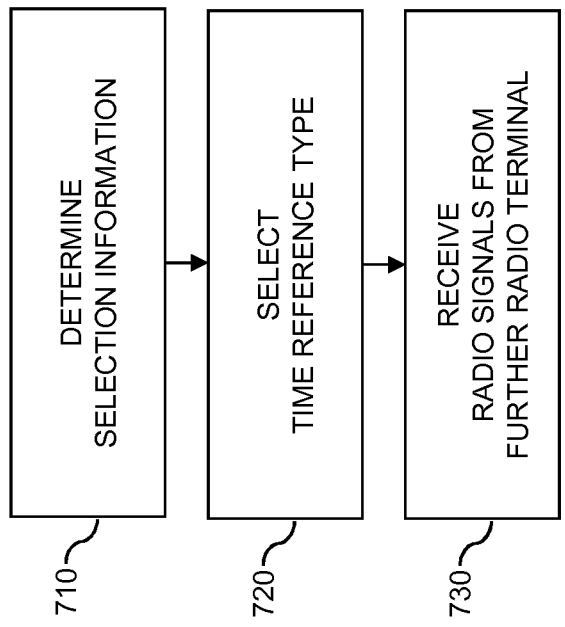
FIG. 7 shows a flowchart for schematically illustrating a method according to an embodiment of the invention.

FIG. 7 shows a flowchart for illustrating a method of controlling radio transmission. The method of FIG. 7 may be utilized for implementing the illustrated concepts in a radio terminal. The radio terminal may correspond to one of the above-mentioned D2D UEs 111, 112, 113, 114, 115 or to the receiving radio terminal 110 or 430. The method may be applied for controlling reception of radio signals from a further radio terminal. The further radio terminal may correspond to one of the above-mentioned D2D UEs 111, 112, 113, 114, 115, to the transmitting radio terminal 110', or to one of the transmitting radio terminals 420, 440, 450. If a processor-based implementation of the radio terminal is used, the steps of the method may be performed by one or more processors of the radio terminal. In such a case the radio terminal may further comprise a memory in which program code for implementing the below described functionalities is stored.

At step 710, the radio terminal determines selection information. The radio terminal may determine the selection information depending on at least one received signal. Examples of such received signals are the above-mentioned signals 201, 205; 301, 305. The at least one received signal may include a signal from a base station of a cellular radio network, such as the signals 201, 205. In addition or as an alternative, the at least one received signal may include signal from another radio terminal, such as the signals 301, 305. The at least one received signal may also include a signal from the further radio terminal, i.e., from the radio terminal signals are received from.

At least a part of the selection information may modulated as digital information onto the at least one received signal. For example, the at least one received signal may act as a carrier of a control channel, and the selection information may be conveyed on this control channel. Accordingly, the selection information may be transmitted explicitly to the radio terminal. Further, at least a part of the selection information may indicated by a set of radio resources on which the at least one received signal is transmitted or by one or more other characteristics of the at least one received signal. The set of radio resources may for example correspond to a resource pool, which may consist of a subset of time and frequency radio resources configured or preconfigured by the network. Accordingly, the selection information may also be indicated implicitly to the radio terminal.

At step 720, the radio terminal selects a time reference type from a plurality of time reference types. This is accomplished depending on the selection information received at step 710.

The plurality of time reference types may include a time reference type defined by a signal from a base station of a cellular radio network. Further, the plurality of time reference types may include a time reference type defined by a signal from a base station of a cellular radio network and an offset with respect to the signal from the base station. In the latter case, the selection information may also include a value of the offset. Further, in such cases the selection information may identify the base station, e.g., in terms of a cell ID. Examples of corresponding time reference types are mentioned above in connection with the time reference signals 207 and 307.

The plurality of time reference types may also include a time reference type defined by a signal from another radio terminal. Further, the plurality of time reference types may include a time reference type defined by a signal from another radio terminal and an offset with respect to the signal from the other radio terminal. In the latter case, the selection information may also include a value of the offset. Further, in such cases, the selection information may identify the other radio terminal, e.g., in terms of a device identifier. Examples of corresponding time reference types are mentioned above in connection with the time reference signals 203 and 303.

In some scenarios, the plurality of time reference types may also include a time reference type defined by a superimposition of signals, e.g., from base stations and/or radio terminals. Further, the plurality of time reference types may include a time reference type defined by a by a superimposition of signals, e.g., from base stations and/or radio terminals, and an offset with respect to the superimposed signals. In the latter case, the selection information may also include a value of the offset. Further, in such cases, the selection information may identify the sources of the signals to be superimposed, e.g., in terms of a device identifier.

The plurality of time reference types may also include a time reference type defined by an absolute time reference. For example, such absolute time reference could be based on UTC or on signals transmitted by a GNSS. In such cases, the selection information may also identify the absolute time reference.

In some scenarios, the radio terminal may select the time reference type also depending on other information, e.g., information on mobility of the radio terminal and/or of the further radio terminal and/or information on radio conditions experienced by the radio terminal and/or the further radio terminal.

At step 730, the radio terminal receives signals from the further radio terminal. The signals may correspond to D2D communication signals, e.g., to V2X communication signals. The reception of the signals is performed based on the selected time reference type. Specifically, depending on the selected time reference type the radio terminal may set a sampling window for reception of the signals from the further radio terminal.

Figure 8:
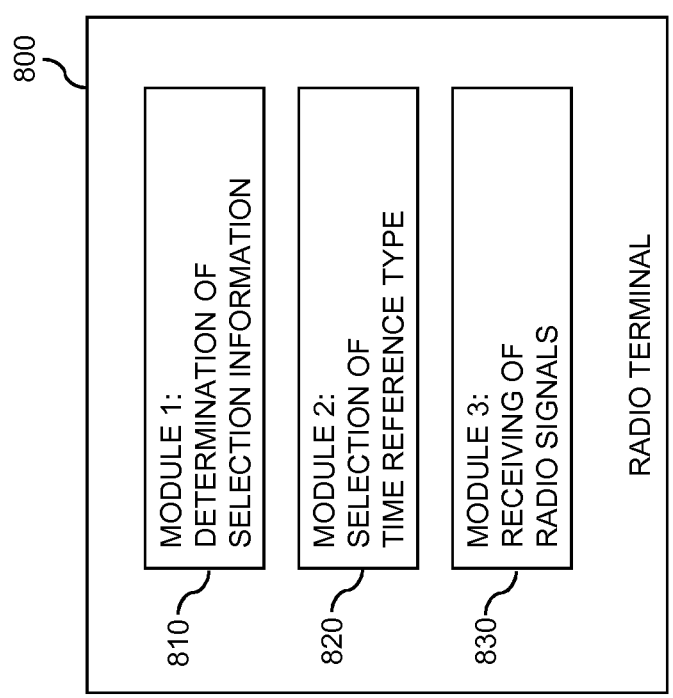
FIG. 8 shows a block diagram for illustrating functionalities of a radio terminal according to an embodiment of the invention.

FIG. 8 shows a block diagram for illustrating functionalities of a radio terminal 800 which operates according to the method of FIG. 7. As illustrated, the radio terminal 800 may be provided with a module 810 configured to determine selection information, such as explained in connection with step 710. Further, the radio terminal 800 may be provided with a module 820 configured to select a time reference type from a plurality of time reference types, such as explained in connection with step 720. Further, the radio terminal 800 may be provided with a module 830 configured to receive signals from a further radio terminal, such as explained in connection with step 730.

It should be understood that the radio terminal 800 may also include further modules for implementing other functionalities, such as functionalities for establishing a D2D link to the further radio terminal or for discovering the further radio terminal, or functionalities for controlling transfer of data on such D2D link. Further, it should be understood that the modules of the radio terminal 800 do not necessarily represent a hardware structure of the radio terminal 800, but may also correspond to functional elements, e.g., implemented by hardware, software, or a combination thereof.

Figure 9:
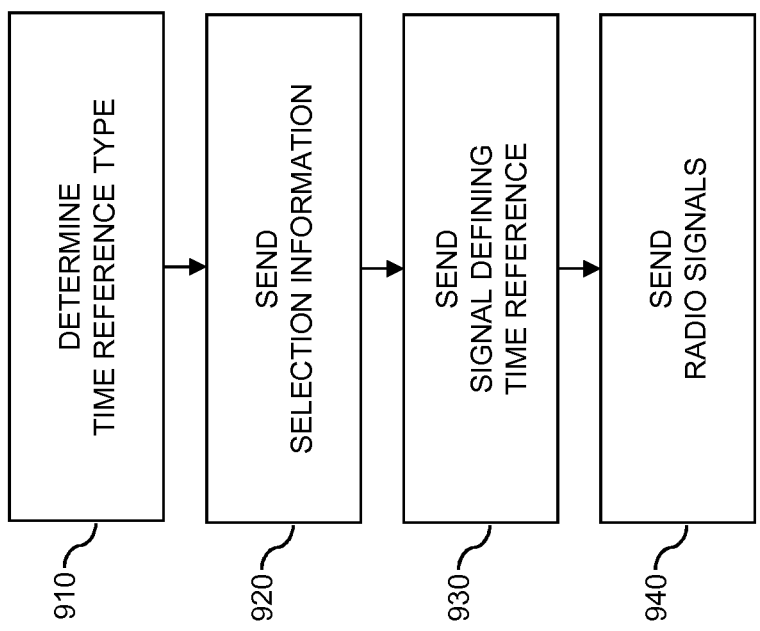
FIG. 9 shows a flowchart for schematically illustrating a further method according to an embodiment of the invention.

FIG. 9 shows a flowchart for illustrating a method of controlling radio transmission. The method of FIG. 9 may be utilized for implementing the illustrated concepts in a radio device. The radio device may correspond to a base station of a cellular radio network, such as the above-mentioned base station 100 or the above-mentioned base station 410. Alternatively, the radio device may correspond to one of the above-mentioned D2D UEs 111, 112, 113, 114, 115, to the transmitting radio terminal 110', or to one of the transmitting radio terminals 420, 440, 450.

The method may be applied for controlling a radio terminal with respect to reception of radio signals from a further radio terminal. The radio terminal may correspond to one of the above-mentioned D2D UEs 111, 112, 113, 114, 115 or to the receiving radio terminal 110 or 430. The further radio terminal may correspond to one of the above-mentioned D2D UEs 111, 112, 113, 114, 115, to the transmitting radio terminal 110', or to one of the transmitting radio terminals 420, 440, 450. In some scenarios, the radio device implementing the method may correspond to the further radio terminal which sends the signals to the radio terminal. If a processor-based implementation of the radio device is used, the steps of the method may be performed by one or more processors of the radio device. In such a case the radio device may further comprise a memory in which program code for implementing the below described functionalities is stored.

At optional step 910, the radio device may determine a time reference type to be applied by the radio terminal for reception of signals from the further radio terminal. In the determination of step 910, the radio device may for example consider information on mobility of the radio terminal and/or the further radio terminal. Further, the radio device may consider information on radio conditions experienced by the radio terminal and/or the further radio terminal.

However, other information or conditions could be considered as well.

At step 920, the radio device sends selection information to the radio terminal. The selection information indicates which time reference type from a plurality of time reference types is to be selected by the radio terminal for reception of signals from the further radio terminal. The time reference type indicated by the selection information may correspond to the time reference type as determined at step 910.

The plurality of time reference types may include a time reference type defined by a signal from a base station of a cellular radio network. Further, the plurality of time reference types may include a time reference type defined by a signal from a base station of a cellular radio network and an offset with respect to the signal from the base station. In the latter case, the selection information may also include a value of the offset. Further, in such cases the selection information may identify the base station, e.g., in terms of a cell ID. Examples of corresponding time reference types are mentioned above in connection with the time reference signals 207 and 307.

The plurality of time reference types may also include a time reference type defined by a signal from another radio terminal. Further, the plurality of time reference types may include a time reference type defined by a signal from another radio terminal and an offset with respect to the signal from the other radio terminal. In the latter case, the selection information may also include a value of the offset. Further, in such cases, the selection information may identify the other radio terminal, e.g., in terms of a device identifier. Examples of corresponding time reference types are mentioned above in connection with the time reference signals 203 and 303.

In some scenarios, the plurality of time reference types may also include a time reference type defined by a superimposition of signals, e.g., from base stations and/or radio terminals. Further, the plurality of time reference types may include a time reference type defined by a by a superimposition of signals, e.g., from base stations and/or radio terminals, and an offset with respect to the superimposed signals. In the latter case, the selection information may also include a value of the offset. Further, in such cases, the selection information may identify the sources of the signals to be superimposed, e.g., in terms of a device identifier.

The plurality of time reference types may also include a time reference type defined by an absolute time reference. For example, such absolute time reference could be based on UTC or on signals transmitted by a GNSS. In such cases, the selection information may also identify the absolute time reference.

The radio device may send the selection information by transmitting at least one signal. Examples of such signals are the above-mentioned signals 201, 205; 301, 305. At least a part of the selection information may modulated as digital information onto the at least one signal. For example, the at least one signal may act as a carrier of a control channel, and the selection information may be conveyed on this control channel. Accordingly, the selection information may be transmitted explicitly to the radio terminal. Further, at least a part of the selection information may indicated by a set of radio resources on which the at least one signal is transmitted or by one or more other characteristics of the at least one signal. The set of radio resources may for example correspond to a resource pool. Accordingly, the selection information may also be indicated implicitly to the radio terminal.

In some scenarios, the radio device may also correspond to a source of a signal defining a time reference. In such cases, the radio device may send the signal defining the time reference at optional step 930. The signal may specifically define the time reference which is to be used by the radio terminal for reception of the signals from the further radio terminal. The signal sent at step 930 may correspond to a dedicated time reference signal, e.g., a synchronization signal. Alternatively, the signal sent at step 930 may also correspond to some other kind of signal, e.g., a signal conveying control data or user data.

As mentioned above, in some scenarios the radio device may correspond to the further radio terminal which sends the signals to be received by the radio terminal. In such cases, the radio device may send the signals at optional step 940 to the radio terminal. The signals may correspond to D2D communication signals, e.g., to V2X communication signals. Sending of the signals may be performed based on the time reference type indicated by the selection information, specifically based on a time reference which is aligned with respect to a time reference as applied by the radio device for reception of the signals. Specifically, the time reference may be applied by the radio device for controlling a time of sending the signals.

Figure 10:
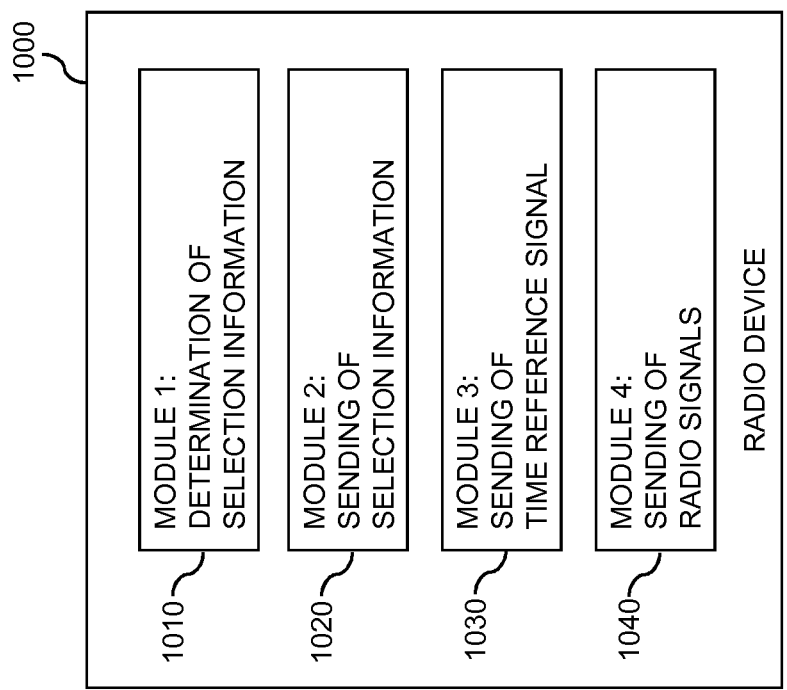
FIG. 10 shows a block diagram for illustrating functionalities of a radio device according to an embodiment of the invention.

FIG. 10 shows a block diagram for illustrating functionalities of a radio device 1000 which operates according to the method of FIG. 9. As illustrated, the radio device 1000 may be provided with a module 1010 configured to determine a time reference type, such as explained in connection with step 910. Further, the radio device 1000 may be provided with a module 1020 configured to send selection information indicating a time reference type to be selected from a plurality of time reference types, such as explained in connection with step 920. Further, the radio device 1000 may be provided with an optional module 1030 configured to send a signal defining a time reference, such as explained in connection with step 930. Further, the radio device 1000 may be provided with an optional module 1040 configured to signals to the radio terminal, such as explained in connection with step 940.

It should be understood that the radio device 1000 may also include further modules for implementing other functionalities, such as functionalities for establishing a D2D link between the radio terminal and the further radio terminal or for discovering the radio terminal, or functionalities for controlling transfer of data on such D2D link. Further, it should be understood that the modules of the radio device 1000 do not necessarily represent a hardware structure of the radio device 1000, but may also correspond to functional elements, e.g., implemented by hardware, software, or a combination thereof.

It is noted that the methods of FIGS. 7 and 9 may also be combined in a system which includes one or more radio terminals operating according to the method of FIG. 7 and one or more radio devices operating according to the method of FIG. 9.

Figure 11:
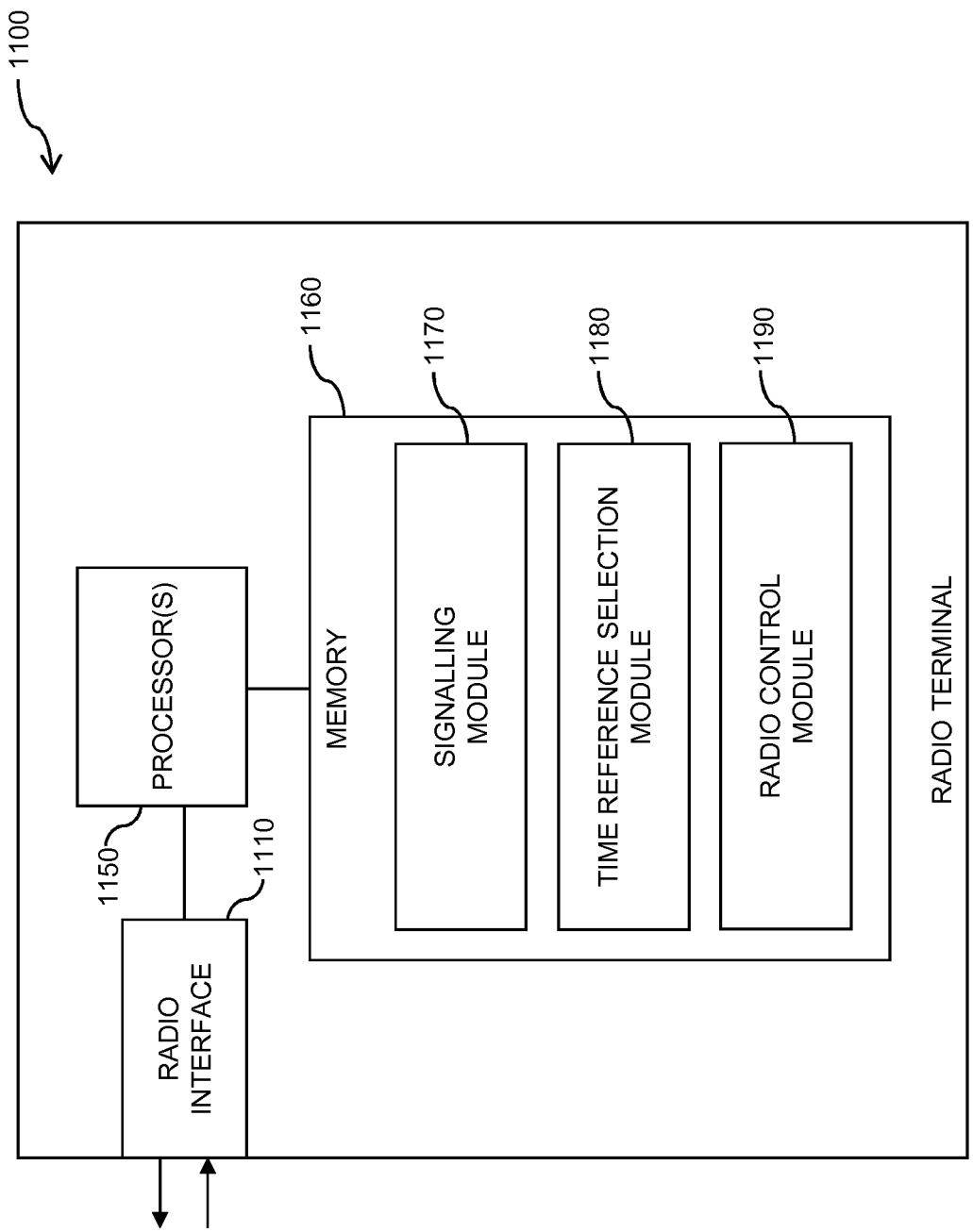
FIG. 11 schematically illustrates structures of a radio terminal according to an embodiment of the invention.

FIG. 11 illustrates exemplary structures which may be used for implementing the above concepts in a radio terminal 1100, such as one of the above-mentioned D2D UEs 111, 112, 113, 114, 115, to the receiving radio terminal 110 or 430, or to one of the transmitting radio terminals 110', 420, 440, 450.

As illustrated, the radio terminal 1100 may include a radio interface 1110 for receiving radio signals from one or more other radio terminals. Further, the radio interface 1110 may also be used for sending radio signals to one or more other radio terminals. Further, the radio interface 1110 may also be used for receiving radio signals from one or more base stations of a cellular radio network, and/or for sending radio signals to one or more base stations of a cellular radio network.

Further, the radio terminal 1100 may include one or more processors 1150 coupled to the radio interface 1110 and a memory 1160 coupled to the processor(s) 1150. The memory

1160 may include a Read Only Memory (ROM), e.g., a flash ROM, a Random Access Memory (RAM), e.g., a Dynamic RAM (DRAM) or Static RAM (SRAM), a mass storage, e.g., a hard disk or solid state disk, or the like. The memory 1160 includes suitably configured program code to be executed by the processor(s) 1150 so as to implement the above-described functionalities of a radio terminal. In particular, the memory 1160 may include various program code modules for causing the radio terminal 1100 to perform processes as described above. Specifically, when the radio terminal acts as a receiver of D2D communication signals, the program code modules may cause the radio terminal 1100 to perform processes corresponding to the method steps of FIG. 7, and when the radio terminal 1100 acts as a transmitter of D2D communication signals, the program code modules may cause the radio terminal 1100 to perform processes corresponding to the method steps of or FIG. 9. It should be noted that in some cases the radio terminal 1100 may also simultaneously act as a receiver and a transmitter of D2D communication signals, e.g., in the case of bi-directional D2D communication or when receiving D2D communication signals from one radio terminal and sending D2D communication signals to another radio terminal.

As illustrated, the memory 1160 may include a signalling module 1170 for implementing the above-described functionalities of receiving or sending signals indicating the selection information, such as explained in connection with step 710 or step 920. Further, the memory 1160 may include a time reference selection module 1180 for implementing the above-described functionalities of determining or selecting a time reference type, such as explained in connection with steps 720 or 910. Further, the memory 1160 may also include a radio control module 1190 for implementing the above-described functionalities of controlling reception or transmission of signals based on a time reference, such as explained in connection with steps 730 or 940.

It is to be understood that the structures as illustrated in FIG. 11 are merely schematic and that the radio terminal 1100 may actually include further components which, for the sake of clarity, have not been illustrated, e.g., further interfaces or processors. Also, it is to be understood that the memory 1160 may include further types of program code modules, which have not been illustrated, e.g., program code modules for implementing known functionalities of a UE or other type of radio terminal. According to some embodiments, also a computer program may be provided for implementing functionalities of the radio terminal 1100, e.g., in the form of a physical medium storing the program code and/or other data to be stored in the memory 1160 or by making the program code available for download or by streaming.

Figure 12:
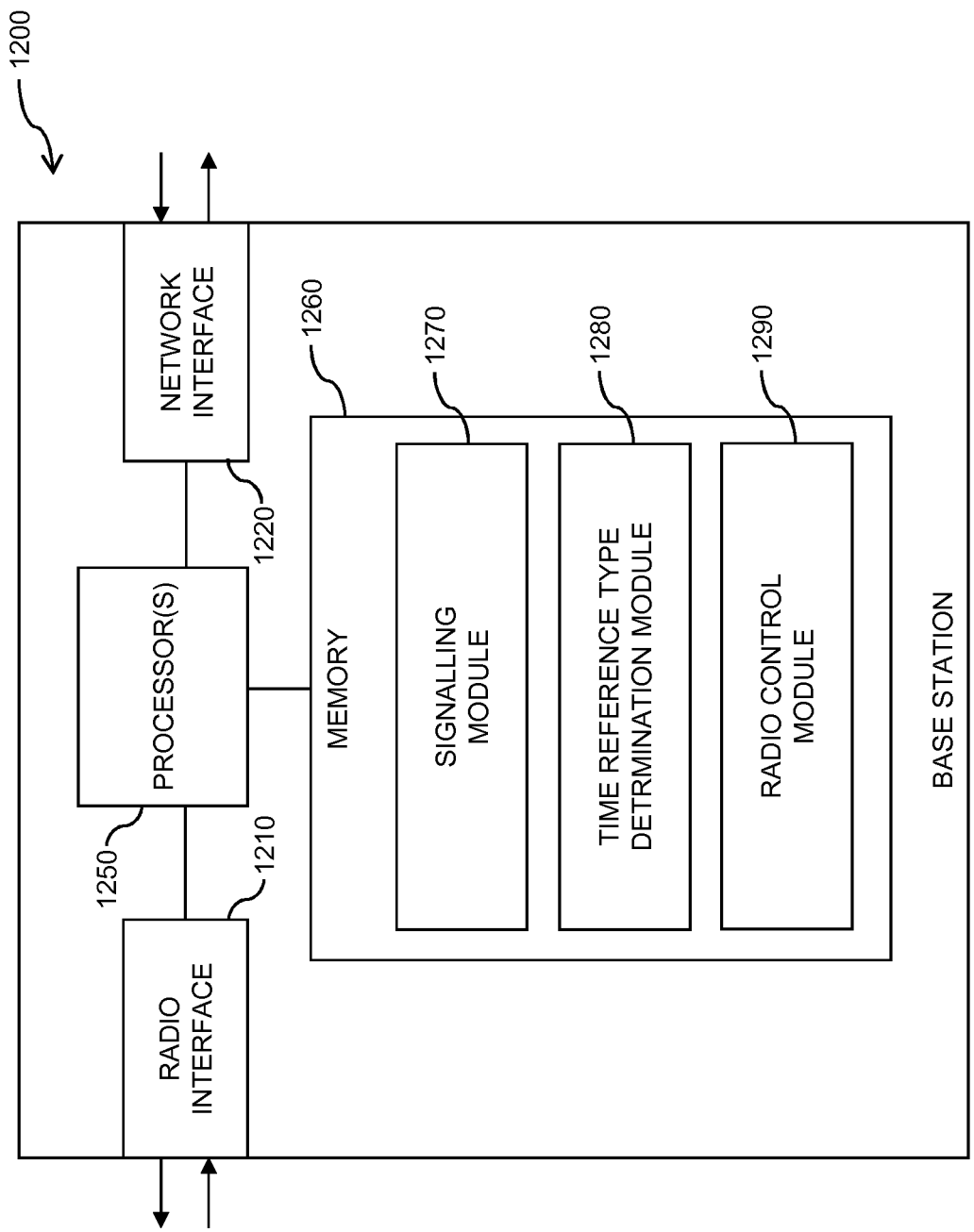
FIG. 12 schematically illustrates structures of a base station according to an embodiment of the invention.

FIG. 12 illustrates exemplary structures which may be used for implementing the above concepts in a base station 1200 of a cellular radio network, such as the above-mentioned base station 100 or 410.

As illustrated, the base station 1200 may include a radio interface 1210 for sending radio signals to one or more other radio terminals and/or for receiving radio signals from one or more radio terminals. These radio terminals may for example correspond to D2D is UEs, such as the above-mentioned D2D UEs 111, 112, 113, 114, 115. Further, the base station may include a network interface 1220 for connecting to other nodes of the cellular radio network, e.g., to one or more other base stations, to one or more control nodes, or to one or more gateway nodes.

Further, the base station 1200 may include one or more processors 1250 coupled to the interfaces 1210, 1220 and a memory 1260 coupled to the processor(s) 1250. The memory 1260 may include a ROM, e.g., a flash ROM, a RAM, e.g., a DRAM or SRAM, a mass storage, e.g., a hard disk or solid state disk, or the like. The memory 1260 includes suitably configured program code to be executed by the processor(s) 1250 so as to implement the above-described functionalities of a base station. In particular, the memory 1260 may include various program code modules for causing the base station 1200 to perform processes as described above. Specifically, the program code modules may cause the base station to perform processes corresponding to the method steps of or FIG. 9.

As illustrated, the memory 1260 may include a signalling module 1270 for implementing the above-described functionalities sending signals indicating the selection information, such as explained in connection with step 920. Further, the memory 1260 may include a time reference selection module 1280 for implementing the above-described functionalities of determining or selecting a time reference type, such as explained in connection with step 910. Further, the memory 1260 may also include a radio control module 1290 for implementing functionalities of controlling radio transmission by radio terminals, e.g., by determining corresponding control information to be applied by the radio terminals. One example of such control information is the above-mentioned selection information.

It is to be understood that the structures as illustrated in FIG. 12 are merely schematic and that the base station 1200 may actually include further components which, for the sake of clarity, have not been illustrated, e.g., further interfaces or processors. Also, it is to be understood that the memory 1260 may include further types of program code modules, which have not been illustrated, e.g., program code modules for implementing known functionalities of an eNB or similar type of base station. According to some embodiments, also a computer program may be provided for implementing functionalities of the base station 1200, e.g., in the form of a physical medium storing the program code and/or other data to be stored in the memory 1260 or by making the program code available for download or by streaming.

As can be seen, the concepts as described above may be used for efficiently controlling radio transmission between radio terminals, specifically with respect to usage of various types of time references for controlling timing of radio transmissions, in particular setting of a reception sampling window. By allowing selection of a time reference from various different time reference types, also complex D2D communication scenarios, as for example may occur in the case of V2X communication, may be addressed.

Further, the concepts may be implemented with only minor changes with respect to timing protocols, i.e., mechanisms of deriving a time reference, as defined for the LTE radio technology. Further, the concepts may be implemented without introducing excessive fixed signalling overhead on carriers supporting V2X communication or other kinds of D2 D communication.

The concepts allow to address the issue that an ITS application may depend on the UE knowing its positions or having some other information obtained from a network node, which means that network coverage is required for the UE. Similarly, an ITS application an may need to rely on the fact that a UE knows its position for processing received data at application layer.

For example, an ITS application may require that the UE is in GNSS and/or eNB coverage, so that such signals may be exploited for reliable synchronization too. Corresponding restrictions may be avoided by more flexible selection of time reference types in the claimed solution. The concepts may also be applied to support SS (Synchronization Signal) and/or PSBCH (Physical Sidelink Broadcast Channel) periodicity reduction of for V2X.

Further, the concepts may enable a more comprehensive control of sidelink receiver behavior, i.e., of behavior of the receiving D2D UE. In particular, it may be taken into account that the optimal timing of the reception sampling window prior to DFT processing is a function of the time reference used by the transmitter (e.g., based on a GNSS signal, an eNB signal, or a sidelink synchronization signal from another UE) as well as a function of a time offset (e.g., timing advance, propagation delay compensation, fixed offset, etc.) as in some cases applied by the transmitter. It is thus useful if the receiver is aware of the time reference type and type of applied offset. In this way efficiency of reception may be improved. Accordingly, in the illustrated concepts the receiver may be provided with information on the time reference type (e.g., based on a GNSS signal, based on an eNB signal, based on a sidelink synchronization signal) and the type of applied time offset (e.g., timing advance, propagation delay compensation, fixed offset, etc.) used by a transmitter, and the receiver may apply this information when receiving signals from this transmitter.

It is to be understood that the examples and embodiments as explained above are merely illustrative and susceptible to various modifications. For example, the illustrated concepts may be applied in connection with various radio technologies, without limitation to the above-mentioned example of an LTE or a 5G radio technology. Further, the illustrated concepts may be applied in connection with various kinds of radio terminals. Moreover, it is to be understood that the above concepts may be implemented by using correspondingly designed software to be executed by one or more processors of an existing device, or by using dedicated device hardware.

The invention claimed is:

1. A method implemented by a radio terminal of controlling radio communication, the method comprising:
   determining selection information depending on a received signal, wherein at least a part of the selection information is indicated by a set of radio resources on which the at least one received signal is transmitted, at least part of the selection information being modulated as digital information onto the at least one received signal;
   depending on the selection information and at least one of a mobility of the radio terminal or a mobility of a further radio terminal, selecting a time reference type from a plurality of time reference types, the plurality of time reference types comprising a time reference type defined by superimposition of signals from the base station and the further radio terminal and an offset with respect to the superimposed signal and the selection information comprising a value of the offset and the selection information identifying the sources of the signals to be superimposed; and
   based on the selected time reference type, setting a sampling window for reception of the signals from the further radio terminal and receiving signals from the further radio terminal during the sampling window.

2. A method of controlling radio communication, the method comprising:
   sending selection information to a radio terminal by transmitting at least one signal, wherein at least a part of the selection information is indicated by a set of radio resources on which the at least one signal is transmitted, at least part of the selection information being modulated as digital information onto the at least one received signal; and
   wherein the selection information indicates which time reference type from a plurality of time reference types is to be selected by the radio terminal for reception of signals from a further radio terminal, the plurality of time reference types comprising a time reference type defined by superimposition of signals from the base station and the further radio terminal and an offset with respect to the superimposed signal and the selection information comprising a value of the offset and the selection information identifying the sources of the signals to be superimposed.

3. A radio terminal, the radio terminal comprising: processing circuitry;
   memory containing instructions executable by the processing circuitry whereby the radio terminal is operative to:
      determine selection information depending on at least one received signal, wherein at least a part of the selection information is indicated by a set of radio resources on which the at least one received signal is transmitted, at least part of the selection information being modulated as digital information onto the at least one received signal;
      depending on the selection information and at least one of one of a mobility of the radio terminal or a mobility of a further radio terminal, select a time reference type from a plurality of time reference types, the plurality of time reference types comprising a time reference type defined by superimposition of signals from the base station and the further radio terminal and an offset with respect to the superimposed signal and the selection information comprising a value of the offset and the selection information identifying the sources of the signals to be superimposed; and
      based on the selected time reference type, set a sampling window for reception of the signals from the further radio terminal and receive signals from the further radio terminal during the sampling window.

4. The radio terminal of claim 3:
   wherein the plurality of time reference types comprise a time reference type defined by an absolute time reference; and
   wherein the selection information identifies the absolute time reference.

5. The radio terminal of claim 3, wherein the instructions are such that the radio terminal is operative to select the time reference type further depending on information on radio conditions experienced by the radio terminal and/or the further radio terminal.

6. A radio device, comprising: processing circuitry;
   memory containing instructions executable by the processing circuitry whereby the radio device is operative to:
      send selection information to a radio terminal by transmitting at least one signal, wherein at least a part of the selection information is indicated by a set of radio resources on which the at least one signal is transmitted, at least part of the selection information being modulated as digital information onto the at least one received signal; and
      wherein the selection information indicates which time reference type from a plurality of time reference types is to be selected by the radio terminal for reception of signals from a further radio terminal, the plurality of time reference types comprising a time reference type defined by superimposition of signals from the base station and the further radio terminal and an offset with respect to the superimposed signal and the selection information comprising a value of the offset and the selection information identifying the sources of the signals to be superimposed.

7. The radio device of claim 6:
wherein the plurality of time reference types comprise a time reference type defined by an absolute time reference; and
wherein the selection information identifies the absolute time reference.

8. A non-transitory computer readable recording medium storing a computer program product for controlling a radio terminal, the computer program product comprising software instructions which, when run on processing circuitry of the radio terminal, causes the radio terminal to:
determine selection information depending on a received signal, wherein at least a part of the selection information is indicated by a set of radio resources on which the at least one received signal is transmitted, at least part of the selection information being modulated as digital information onto the at least one received signal;
depending on the selection information and at least one of a mobility of the radio terminal or a mobility of a further radio terminal, select a time reference type from a plurality of time reference types, the plurality of time reference types comprising a time reference type defined by superimposition of signals from the base station and the further radio terminal and an offset with respect to the superimposed signal and the selection information comprising a value of the offset and the selection information identifying the sources of the signals to be superimposed; and
based on the selected time reference type, set a sampling window for reception of the signals from the further radio terminal and receive signals from the further radio terminal during the sampling window.

9. A non-transitory computer readable recording medium storing a computer program product for controlling a radio device, the computer program product comprising software instructions which, when run on processing circuitry of the radio device, causes the radio device to:
send selection information to a radio terminal by transmitting at least one signal, wherein at least a part of the selection information is indicated by a set of radio resources on which the at least one signal is transmitted, at least part of the selection information being modulated as digital information onto the at least one received signal; and
wherein the selection information indicates which time reference type from a plurality of time reference types is to be selected by the radio terminal for reception of signals from a further radio terminal, the plurality of time reference types comprising a time reference type defined by superimposition of signals from the base station and the further radio terminal and an offset with respect to the superimposed signal and the selection information comprising a value of the offset and the selection information identifying the sources of the signals to be superimposed.

* * * * *